United States Patent [19]

Takada

[11] 3,871,599
[45] Mar. 18, 1975

[54] AUTOMATIC LOCKING SAFETY BELT RETRACTION REEL

[75] Inventor: Takezo Takada, Hikone, Japan

[73] Assignee: Takata Kojyo Co., Ltd., Tokyo, Japan

[22] Filed: June 13, 1973

[21] Appl. No.: 369,656

[30] Foreign Application Priority Data
June 17, 1972  Japan................................ 47-71004

[52] U.S. Cl. ............................................. 242/107.2
[51] Int. Cl...................... A62b 35/00, B65h 75/48
[58] Field of Search........ 242/107.2, 107 SB, 107.3, 242/107.4, 107.5; 280/150 SB; 297/385–388; 200/61.58 B

[56] References Cited
UNITED STATES PATENTS

| | | | |
|---|---|---|---|
| 2,705,529 | 4/1955 | Bull et al...................... | 242/107 SB |
| 3,172,700 | 3/1965 | Haas............................ | 242/107 SB |
| 3,237,729 | 3/1966 | Proctor ........................ | 242/107 SB |
| 3,266,842 | 8/1966 | Board et al................... | 242/107 SB |
| 3,372,777 | 3/1968 | Filippi et al.................. | 280/150 SB |
| 3,411,602 | 11/1968 | Royce ......................... | 280/150 SB |
| 3,610,361 | 10/1971 | Pringle.......................... | 242/107.4 |

Primary Examiner—John W. Huckert
Assistant Examiner—John M. Jillions
Attorney, Agent, or Firm—Wolder & Gross

[57] ABSTRACT

An electrically controlled safety belt locking mechanism includes a bracket supporting a spring biased take-up reel, the belt extending from the reel about a knurled roller having gear teeth at opposite ends. A clamp member is swingably supported and includes fingers which are urged to clamp the belt against the roller and which is spring retracted and includes a rack which is movable with the clamp member into engagement with the roller teeth. A pawl is swingably mounted on the clamp member and spring urged into engagement with the roller teeth and is retracted from such engagement by a clamp member mounted electromagnet. The belt is normally freely withdrawn with the electromagnet energization and upon deenergization of the magnet the pawl engages the roller teeth to swing the clamp rack into engagement with the teeth and further rotation of the roller advances the clamp member into a belt locking position.

8 Claims, 4 Drawing Figures

AUTOMATIC LOCKING SAFETY BELT RETRACTION REEL

BACKGROUND OF THE INVENTION

The present invention relates generally to improvements in vehicle safety belt systems and it relates more particularly to an imporved automatic locking safety belt retraction reel.

The conventional vehicle safety belt is generally rewound onto a spring biased rewinding reel which is suitable mounted and is normally fully withdrawn for its full length from the reel in the belt buckled condition, the belt requiring adjustment to accommodate the size of the seat occupant. The safety belt systems employing the above type of retraction reel possesses numerous drawbacks and disadvantages. To begin with, they are highly inconvenient since they require frequent adjustment, but, even more important, they are highly uncomfortable and often hazardous since they greatly restrict the movement of the occupant under normal conditions, thereby interfering with his free movement and his optimum handling and control of the vehicle. Moreover, a passenger employing such a belt system frequently attempts to leave the seat without unbuckling the belt, and being firmly confined is subject to possible injury. Many types of safety belt retraction reels have been available and proposed, which normally permit the free movement of the seat occupant, but which lock the belt against withdrawal and restrict the movement of the seat occupant in response to a rapid acceleration, deceleration or tilting of the vehicle attendent to a collision. However, these reels have been awkward and unreliable devices subject to malfunctioning and otherwise leave much to be desired.

SUMMARY OF THE INVENTION

It is a principal object of the present invention to provide an improved vehicle safety belt system.

Another object of the present invention is to provide an improved safety belt retraction reel.

Still another object of the present invention is to provide an improved safety belt retraction reel of the type permitting the free withdrawal of the belt, but which automatically locks the belt against withdrawal in response to vehicle collision conditions, such as rapid deceleration, acceleration or tilting of the vehicle.

A further object of the present invention is to provide a device of the above nature characterized by its ruggedness, reliability, ease and convenience of use and great versatility and adaptability.

The above and other objects of the preset invention will become apparent from a reading of the following description taken in conjuction with the accompanying drawings which illustrate a preferred embodiment thereof.

In a sense, the present invention contemplates the provision of an automatic locking vehicle safety belt system comprising a spring biased belt rewind reel, a belt would on and extending from the reel, a rotatable drive member engaged and driven by the belt, a locking member movable between a position locking the belt against withdrawal and a retracted position and resiliently urged to its retracted position, means for drive coupling the locking member to the drive member to advance the locking member with the rotation of the drive member, and means for actuating the coupling means.

In its preferred form, the improved system includes a bracket having a base plate and side plates and the reel is journalled between the forward sections of the side plates and the drive member is journalled between the side plate rear lower sections and consists of a roller having a knurled medial section and toothed gear defining side portions. The belt extends from the front bottom of the reel shaft rearwardly over and around the knurled portion of the drive roller and then forwardly. The locking member is swingably supported between the side plates above the drive roller and includes a clamp member directed rearwardly toward the roller and belt top face and racks movable toward engagement with the roller. The locking member is forwardly spring biased with the racks out of engagement with the gears. A pair of pawls are hinged on the locking member and spring urged into engagement with the gears and a pair of solenoids are mounted on the locking member and when energized, retract the pawls.

The improved belt retraction reel is reliable, rugged, easy and convenient to use and highly versatile and adaptable.

DESCRIPTION OF THE PREFERRED EMBODIMENT

Figure 1:
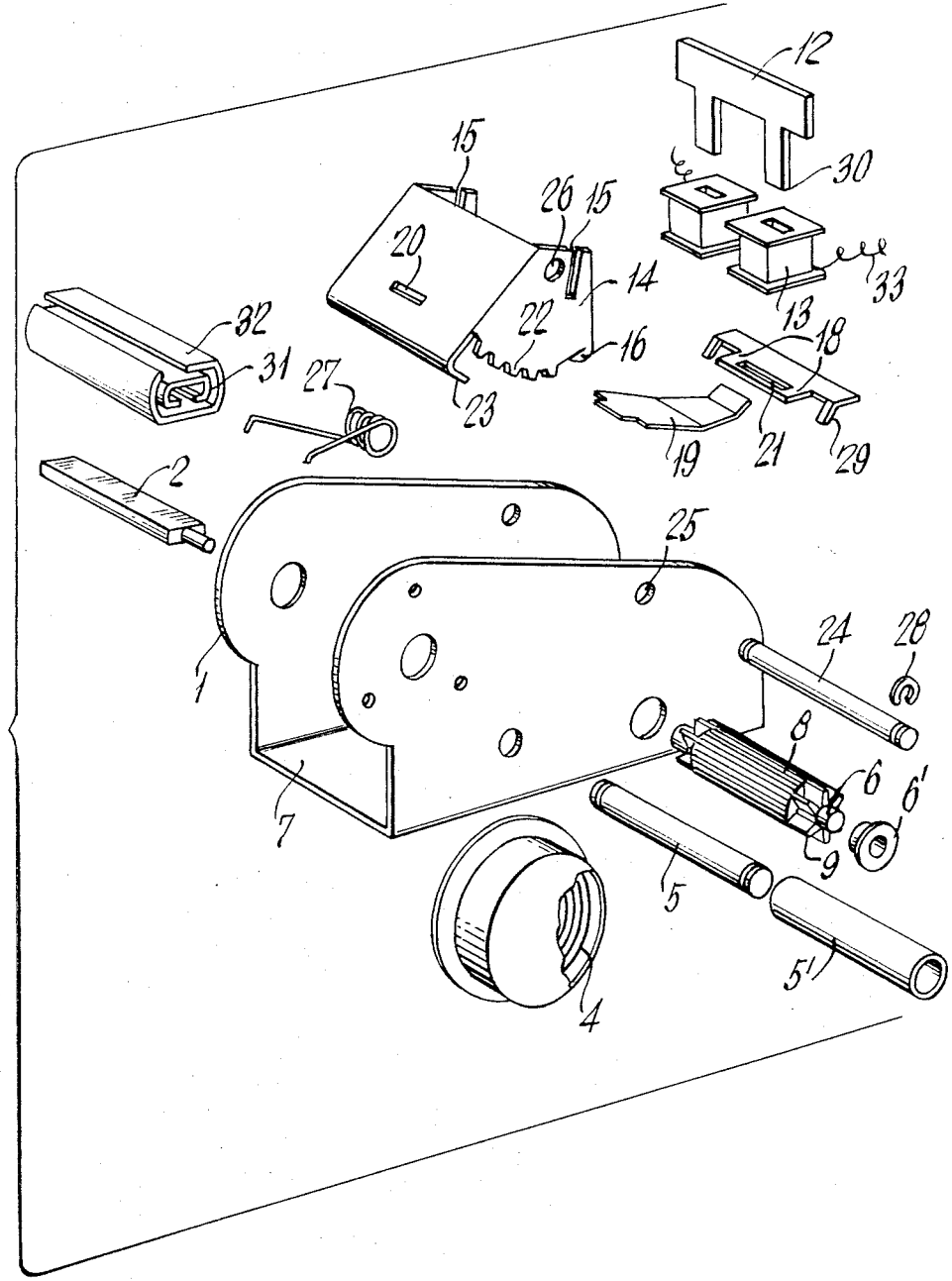
FIG. 1 is an exploded perspective view of a retraction reel embodying the present invention.

Referring now to the drawings which illustrate a preferred embodiment of the present invention, the reference numeral 1 generally designates a U-shaped frame or mounting bracket including a flat base and parallel upstanding side plates. A reel shaft 2 having a noncircular medial section extends between and is journalled in openings proximate the front upper corners of the bracket side plates and is engaged by a pair of coaxial split sleeves 31 and 32 which firmly secure the end of a safety belt 3 to the shaft 2. The shaft 2 is biased to rotate in a belt wind or take-up direction, clockwise as viewed in FIG. 2, by a spiral windup spring 4 housed in a case mounted on the outside face of the bracket side plate.

A guide idler roller 5' is freely rotatably supported shortly above the bracket base rearwardly of reel shaft 2 by a transverse axle 5 journalled in opposite openings in the bracket side plates and suitably locked in position. A pair of transversely aligned openings are formed in the bracket side plates rearwardly and slightly below the level of the axis of idler roller 5' and are engaged by bearing bushings 6'. A transverse drive shaft 6 extends between and is journalled in bushings 6' and includes a knurled enlarged medial section 8 flanked at opposite ends by integrally formed gear defining teeth 9 which are adjacent the inside faces of the bracket side plates. The belt 3 extends from the forward lower part thereof wound upon reel shaft 2 rearwardly beneath idler roller 5, to the upper part and about the knurled portion 8 of drive shaft 6, leaving gears 9 exposed and thence forwardly shortly above the bracket base to the forward outlet section 7.

The belt locking mechanism includes a swingable locking member 14 embraced between the bracket side plates above drive roller 6 and includes side plates confronting the bracket side plates and a forward transverse cross web. A pair of transversely aligned openings 26 formed in the upper front corners of the locking member side plates are engaged by a transverse shaft 24 which is journalled in transversely aligned openings 25 formed in the upper rear portions of the bracket side plates and locked against axial movement by slit resilient locking rings 28 engaging grooves formed in the outer ends of shaft 24.

Formed along the lower edges of the locking member side plates are arcuate rack defining teeth 22 concentric with shaft 24 and movable into and out of meshing engagement with gears 9. A transversely spaced curved clamp member 23 is formed at the lower front edge of locking member 14 below the level of racks 22 and projects rearwardly, downwardly, so as to swing toward the front lower periphery of gears 9 with the counter-clockwise swinging of locking member 14 and thereby clamp and lock the underlying run of belt 3 against gears 9 and knurled portion 8. The locking member 14 is resiliently biased by a hairpin spring 27 supported by shaft 24 clockwise to its retracted position with racks 22 out of engagement with gears 9 and clamp member 23 retracted.

The racks 22 and gear 9 define a drive coupling which is actuated by a latch member 17 which includes an upper transverse armature defining plate 18 of magnetic material extending between and swingably supported by depending ears 16 located at the rear bottom corners of the side plates of locking member 14. A pair of pawl defining teeth 29 depend from the sides of plate 18 and are movable out of and into engagement with gears 9 with the clockwise and counter-clockwise rocking respectively of plate 18. A longitudinally extending leaf spring 19 has a forward tongue engaging a horizontal medial slot 20 in the locking member front wall and a rear tongue engaging a rectangular opening 21 in plate 18 to resiliently urge latch member 17 in a counter-clockwise direction to bring teeth 29 into engagement with gears 9.

Formed in the upper edge of the locking member side plates rearwardly of openings 26 are a pair of transversely aligned rectangular notches 15 and a cross bar 12 of magnetic material extends between and rests in the notches 15. Integrally formed with and depending from cross bar 12 are cores or legs 30 of magnetic material and a solenoid 13 engages each of the legs 30. The underfaces of electromagnet legs 30 confront the armature plate 18 forward of the rocking axis thereof so that upon electrical energization of the series connected solenoids 13, the armature 18 is attracted by the electromagnet legs 30 and swung clockwise to retract the teeth 29 from gears 9. The solenoids 13 are connected by way of leads 33 through a control circuit to a source of current such as a battery so that under normal conditions the solenoids 13 are energized and are deenergized upon the tilting or rapid acceleration or deceleration of the vehicle attendent to a collision, accident or other unusual condition. Such circuits are known in the art and include inertia switches and other control switches.

Considering now the operation of the improved safety belt system described above, under normal conditions the solenoids 13 are energized to retract teeth 29 from gears 9 by attraction of the armature 18 by electromagnetic legs 30 and the locking member 14 is swung by spring 27 to its retracted position with racks 22 out of engagement with gears 9 and clamp member 23 retracted from belt 3 and shaft 6. Under these conditions the belt 3 is freely withdrawn from the reel and is retracted under the influence of spring 4 so that the seat occupant engaged by the buckled belt does not restrict or confine the movement of the occupant.

In the event of a collision or accident the circuit to solenoids 13 is opened to deenergize the solenoids and release armature 18 so that actuating member 17 is swung counter-clockwise by leaf spring 17 to advance teeth 29 into engagement with gears 9. Any withdrawal of the belt 3 through the front of the bracket causes the clockwise rotation of shaft 6 and gears 9 by reason of the frictional drive engagement between belt 3 and knurled portion 8. The clockwise rotation of gears 9 causes the locking member 14 to swing counter-clockwise by their action on teeth 29 until the racks 22 engage the gears 9 to further drive the locking member counter-clockwise and advance the clamp member 23 against the upper run of belt 3 and clamping it between shaft 6 and clamping member 23 into frictional engagement with knurled portion 8 thereby preventing any further withdrawal of belt 3 and positively firmly restricting the forward movement of the seat occupant.

Figure 2:
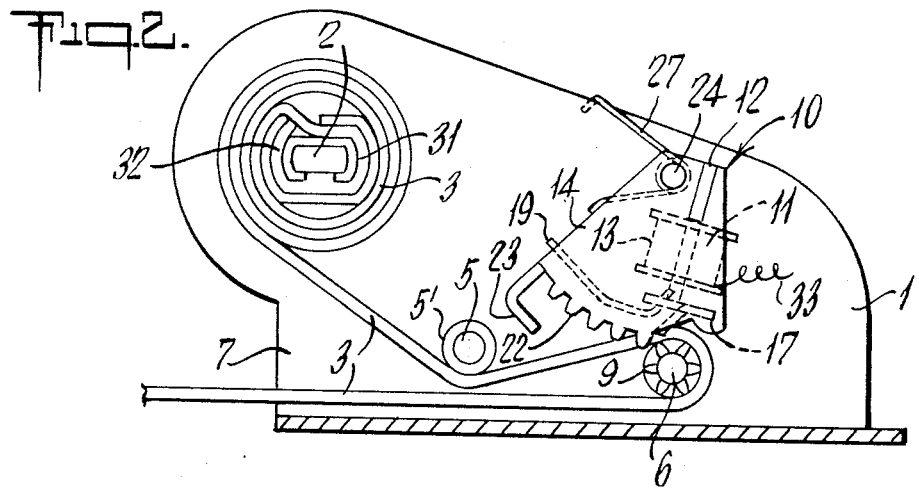
FIG. 2 is a side elevational view thereof with parts removed for clarity of illustrations.
Figure 3A:
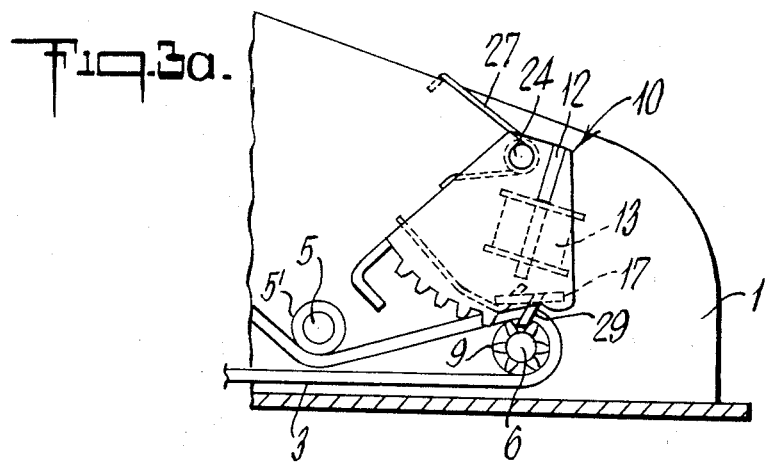
FIG. 3a is a fragmentary view of FIG. 2 showing the initiation of the belt locking sequence.
Figure 3B:
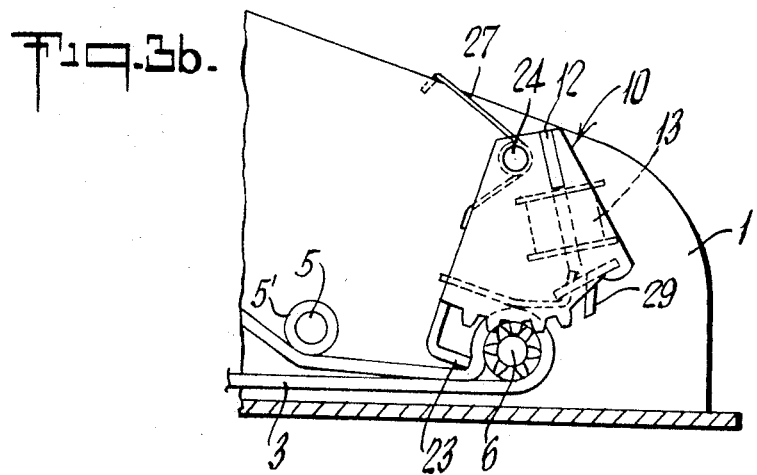
FIG. 3b is a view similar to FIG. 3 a showing the reel in a belt locked position.

The reel may be returned to its normal position as shown in FIG. 2 by merely energizing the solenoids 13 to retract teeth 29 out of the path of gears 9 and loosening the belt 3 to permit its retraction so that gears 9 may rotate counter-clockwise and permit the retraction of locking member 14 under the influence of spring 27.

The improved belt take-up device described above may be suitable mounted in any desired position independent of the vehicle acceleration and attitude sensing device and control circuit thereby leading to great convenience and simplicity. For example, the device may be mounted directly to the seat on the floor, a body post, the roof or the like. The device is positive acting, rugged and highly reliable.

While there has been described and illustrated a preferred embodiment of the present invention, it is apparent that numerous alterations, omissions and additions may be made without departing from the spirit thereof.

I claim:

1. An automatic locking vehicle safety belt system comprising a belt retractor reel, a belt extending from said retractor reel, spring means urging said reel to rotate in a belt retracting direction, a rotatable drive member engaged and driven by said belt and spaced from said reel, a locking member movable between an advanced position locking said belt against withdrawal and a retracted position, means resiliently urging said locking member to its retracted position, drive coupling means movable between a disengage position and an engage position drive coupling said locking member to said drive member to advance said locking member with the rotation of said drive member toward its advanced position urging a portion of said belt to said drive member and means for advancing said drive coupling means to said engage position.

2. The system of claim 1 wherein said drive member comprises a roller, said belt extending about said roller, and said drive coupling means comprises a gear coaxially affixed to and rotatable with said roller and a rack located on and movable with said locking member into engagement with said gear with the advance of said locking member from its retracted position.

3. The system of claim 2 wherein said means comprises means for advancing said locking member from its retracted position.

4. An automatic locking vehicle safety belt system comprising a belt retractor reel, spring means urging said reel to rotate in a belt retraction direction, a roller spaced from said reel, a belt extending from said reel about said roller, a gear located on and rotatable with said roller, a locking member movable between an advanced position locking said belt against withdrawal and a retracted position, means resiliently urging said locking member to its retracted position and having a rack located thereon and movable therewith into engagement with said gear with the advance of said locking member from its retracted position, a pawl mounted on said locking member for movement thereon between an advance position engaging said gear and a retracted position, and means for advancing and retracting said pawl, engagement of said gear by said pawl and rotation of said gear by said roller advancing said locking member to bring said rack into engagement with said gear whereby further rotation of said gear advances said rack and locking member.

5. The system of claim 4 wherein said pawl advancing and retracting means comprises spring means urging said pawl to its advanced position, a solenoid mounted on said locking member and means responsive to the electrical energization of said solenoid for retracting said pawl.

6. An automatic locking vehicle safety belt system comprising a bracket including a base plate and side plates, a retractor reel rotatably supported between the upper forward sections of said side plates, a roller journalled between the lower rear sections of said side plates and including a knurled medial section and a coaxial gear end section rotatable with said medial section, a locking member swingably mounted between said bracket side plates above said roller and including a finger located forwardly of said roller and being rearwardly directed and swingable toward said roller and having a rack movable into engagement with said gear with the advance swinging of said locking member from its retracted position, means resiliently urging said locking member to its retracted position and a pawl mounted on said locking member and means for moving said pawl into engagement with said gear to thereby advance said locking member to advance said rack into engagement with said gear, the rotation of said roller with the retraction of said belt rotating said gear to advance said locking member toward said roller and thereby advance said finger into engagement with said belt and clinch said belt about said roller to prevent further rotation of said belt.

7. The system of claim 6 including spring means urging said pawl toward engagement with said gear.

8. The system of claim 7 including an electromagnet retaining said pawl from engagement with said gear upon energization of said electromagnet.

* * * * *